United States Patent [19]
Massey

[11] Patent Number: 5,170,412
[45] Date of Patent: Dec. 8, 1992

[54] MULTIPLE ACCESS METHOD
[75] Inventor: James L. Massey, Zurich, Switzerland
[73] Assignee: Ascom Tech AG., Bern, Switzerland
[21] Appl. No.: 795,478
[22] Filed: Nov. 21, 1991
[30] Foreign Application Priority Data
Nov. 22, 1990 [CH] Switzerland ............ 3702/90
[51] Int. Cl.[5] .................... H04N 1/00
[52] U.S. Cl. ........................ 375/1
[58] Field of Search ................ 375/1
[56] References Cited

PUBLICATIONS

W. C. Wong et al. "Synchronous vs Asynchronous CDMA for Fiber Optic LANS Using Optical Signal Processing", Nov. 1989, pp. 1012–1016.
de Graauw et al. "Pseudo-Random Binary Sequeces for Multiplex Codes", Dec. 1970, pp. 2658–2660.
Birk et al. "Code-Assignment Policies for Multi-Receiver Nodes in CDMA Packet Radio Networks", Apr. 1986.

*Primary Examiner*—Thomas H. Tarcza
*Assistant Examiner*—David Cain
*Attorney, Agent, or Firm*—Brady, O'Boyle & Gates

[57] ABSTRACT

In a multiple access method for the simultaneous exchange of several data streams ($\{B_{1,m}\}$, $\{B_{2,m}\}$, $\{B_{3,m}\}$) among several participants of a transmission system, various data streams ($\{B_{1,m}\}$, $\{B_{2,m}\}$, $\{B_{3,m}\}$) with the same spread sequence (s[.]) are expanded to a corresponding DSSS signal ($\{B_{1,m}s[.]\}$, $\{B_{2,m}s[.]\}$, $\{B_{3,m}s[.]\}$). During transmission, the various DSSS signals ($\{B_{1,m}s[.]\}$, $\{B_{2,m}s[.]\}$, $\{B_{3,m}s[.]\}$) are heterodyned to a single incoming signal. For detecting the various data streams in a receiver, the incoming signal is filtered in a filter that is inverse with respect to the joint spread sequence (s[.]). In order to permit reliable detection, heterodyning takes place in each case so that the spread sequence intervals pertaining to different data streams are chronologically shifted with respect to one another by a given minimum value (delta_T). The invention provides a multiple access method combining therein the advantages of TDMA and CDMA. In particular, an almost complete separation of the users is possible without requiring the precision of synchronization customary in case of TDMA.

11 Claims, 3 Drawing Sheets

MULTIPLE ACCESS METHOD

FIELD OF ART

The invention relates to a multiple access method for the simultaneous exchange of several data streams between several participants of a transmission system wherein various data streams having the same spread sequence are spread to a corresponding DSSS signal, and the various DSSS signals are heterodyned during transmission into a single incoming signal.

STATE OF THE ART

In mobile radio technology, several users are practically always serviced simultaneously by a single base station. The signals from various participants should, in such a system, be ideally orthogonal. In other words, the receiver of the mobile station or, respectively, the base station can filter out the signal intended for it from the base station or, respectively, the mobile station in such a way that there are no signal components at all from other users any more.

Besides the customary time- and frequency-multiplexing methods, it is also possible to utilize for this purpose the DSSS-CDMA technique (DSSS=direct sequence spread spectrum; CDMA=code division multiple access).

In the TDMA system (TDMA=time division multiple access), the time axis is divided into slots of a given length T. A user is then allocated, within a specific time frame of K slots, in all cases the k-th slot in such a way that never two users will transmit in the same slot.

The primary advantage of TDMA systems resides in that there is essentially no interference between various users. The price to be paid for attaining this advantage is the high precision of synchronization of the K users. A second significant drawback resides in the high peak power: Each transmitter must be able to provide, as the maximum power (peak power), K times its average power. Finally, the system is rather inflexible: Specific protocols are required to be able to allocate time notches (so-called slots) to new users, namely even if the slots are sparingly occupied, i.e. if only a small portion of the maximally admitted participants is active.

In DSSS-CDMA systems, each symbol of the data stream is multiplied with a predetermined spread sequence and transmitted. In the binary case, each data bit determines the polarity of an entire pulse sequence made up of L "chips". A chip herein can assume the value of +1 or -1. In order to separate the individual users, each is allocated a separate spread sequence. In the receiver, the transmitted signal is processed by a filter bank of K matched filters. Each of the K filters is adapted to the spread sequence of one of the users. For an optimal system, the sequences are to be fixed so that the cross correlation between various spread sequences and thus also the interference between the various data strams becomes a minimum.

An analysis of a DSSS-CDMA system is contained in the article "Performance Evaluation for Phase-Coded Spread-Spectrum Multiple-Access Communication —Part I+II", Michael B. Pursley, IEEE Trans. on Communications, Vol. COM-25, No. 8, Aug. 1977, pp. 795–803.

The primary advantage of the CDMA systems resides in that it is no longer necessary to maintain exact synchronization among the participants. Indeed, such systems are usually operated in a completely asynchronous fashion. A further advantage ensues from the fact that the transmitters transmit continuously. In other words, the peak power is substantially congruent with the average power.

The essential disadvantage is to be seen in that the interference from other users in total cannot be ignored. This interference is pronounced, in particular, in case the users are received with greatly differing field strengths ("near-far effect"). For this reason, the transmission line of the users is frequently regulated.

Customarily, this interference, rather than thermal noise, restricts the maximum number of users. From the viewpoint of circuit technology, after all, it is disadvantageous that as many matched filters as there are users are needed in the receiver. This is quite frequently the reason why a decision against CDMA is made when realizing mobile radio systems.

A so-called "Spread Aloha" method is proposed in the publication "Development of the ALOHANET", N. Abramson, IEEE Trans. on Information Theory, Vol. II-31, No. 2, Mar. 1985. In this method, a time spread is inserted in the Aloha channel, i.e. each data packet is weighted in correspondence with the chips of a binary sequence and repeatedly transmitted. In the receiver, the time-spread data stream is again compressed approximately to the duration of a data packet by means of matched filtering.

Thus, by the time spread process, the ratio of peak power to average power can be kept small as in case of CDMA but the good properties of the Aloha principle are not greatly impaired with respect to prevention of packet collisions in the time span (so-called "collision resolution"). One disadvantage of the method resides in that spreading cannot be entirely canceled out by the matched filtering.

SUMMARY OF THE INVENTION

It is an object of the invention to provide a multiple access method of the type discussed herein-above which avoids the problems existing in the state of the art. In particular, it is an object of the invention to propose a system permitting a large number of participants to share the same frequency spectrum in a manner advantageous with respect to TDMA as well as DSSS-CDMA.

According to the invention, the object has been attained by providing that, for detecting the various data streams in a receiver, the incoming signal is filtered in a filter that is inverse with respect to the joint spread sequence, and that the heterodyning takes place in such a way that the spread sequence intervals pertaining to different data streams are chronologically shifted with respect to each other by a predetermined minimum value.

The basic aspect of the process according to this invention resides in the use of an inverse filter in place of a matched filter. This permits the realization of a multiple access system avoiding the so-called inter-user interference without requiring precise synchronization.

According to an advantageous embodiment, the time shift of the spread sequence intervals pertaining to various data streams is larger than the duration of a chip plus the duration of the transient response of a channel utilized for transmitting the corresponding DSSS signal. Thereby the individual users can be clearly separated from one another. Furthermore, it is thus possible to estimate the channel transient response for each transmission channel in the detector.

In this connection, attention is invited, in particular, to the concurrent application by the same applicant on the inverse filter receiver (inventors: F. Neeser, M. Hufschmied and J. Ruprecht). Its content is to be considered included in this specification.

In a system with many users, the protocol becomes especially simple if the time shift with respect to adjacent spread sequence intervals is approximately of the same size for all spread sequence intervals pertaining to different data streams.

The inverse filter is a time-discrete filter responding to the given spread sequence as such with a Kronecker delta sequence.

Preferably, the coefficients v[k] of the inverse filter pertaining to the spread sequence s[.] satisfy the following relationship:

$$v[k] = \frac{1}{2\pi} \int_{-\pi}^{\pi} \frac{d\Omega}{\sum_{i=0}^{L-1} s[i]e^{j(i-k)\Omega}}, \quad k = -M_1 \ldots L + M_2,$$

$$v[k] = 0, \text{ for } k < -M_1 \text{ and } k > L + M_2.$$

Further preferred approximations relate to approximating the Kronecker delta sequence along the lines of minimum square errors, or of a maximum POP ratio.

An optimal or at least relatively optimal spread sequence s[.] is fixed so that the process gain G, defined by the inverse of the energy of the associated inverse filter:

$$G = \frac{1}{\sum_{i=-\infty}^{+\infty} v[i]^2}$$

is at a maximum with respect to all or maximally many spread sequences of a given length L.

One possibility of ensuring that the minimal time spacings are maintained resides in transmitting, via a separate channel, synchronizing signals to the participants of the transmission system.

The method according to this invention is readily suitable for mobile radio systems. One example is represented by the microcellular mobile radio network where the mobile participating stations move in a perimeter of typically several meters up to maximally about 100 meters from a base station.

Additional advantageous embodiments can be derived from the totality of the dependent claims.

BRIEF DESCRIPTION OF THE DRAWINGS

The invention will be described in greater detail below with reference to embodiments and in conjunction with the drawings wherein.

The reference numerals utilized in the drawings and their meanings are summarized in the list of symbols. Basically, identical parts in the figures bear the same reference numerals.

WAYS OF EXECUTING THE INVENTION

Figure 1:
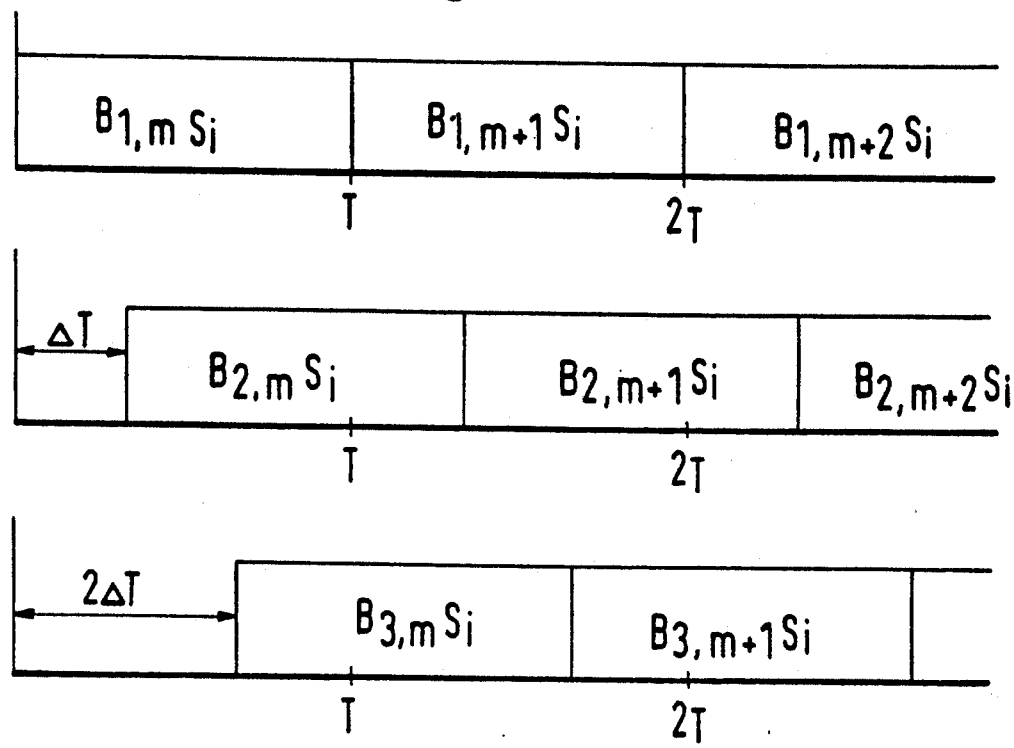
FIG. 1 is an illustration of the synchronization of various data streams.

FIG. 1 depicts the principle of the invention. The objective of the method according to this invention resides in simultaneously transmitting several separate data streams $\{B_{1,m}\}$, $\{B_{2,m}\}$, $\{B_{3,m}\}$, $m=0, 1, 2, \ldots$. Transmission is to take place in the same HF range. Thus, typically, several transmitters will modulate their data streams onto a carrier oscillation, the frequency of which is the same for all.

The data streams $\{B_{1,m}\}$, $\{B_{2,m}\}$, $\{B_{3,m}\}$ contain digital (e.g. binary) data in the form of symbols $B_{1,m}$, $B_{2,m}$, $B_{3,m}$ occurring in the respective data stream with a given symbol duration T. The individual data streams $\{B_{1,m}\}$, $\{B_{2,m}\}$, $\{B_{3,m}\}$ are covnentionally spread apart: Each symbol $B_{1,m}$, $B_{1,m+1}$, $B_{1,m+2}$, is multiplied with a fixedly predetermined, aperiodic spread sequence s[i], $i=0 \ldots L$, of the length L. Thus, the spread sequence consists of L "chips" with a chip period $T_c=T/L$. The result of this transition from T to T/L is a DSSS signal $\{B_{1,m}s[.]\}$.

Each data stream $\{B_{1,m}\}$, $\{B_{2,m}\}$, $\{B_{3,m}\}$ is processed in the aforedescribed way to a corresponding DSSS signal $\{B_{1,m}s[.]\}$, $\{B_{2,m}s[.]\}$, $\{B_{3,m}s[.]\}$. The various DSSS signals $\{B_{1,m}s[.]\}$, $\{B_{2,m}s[.]\}$, $\{B_{3,m}s[.]\}$ are then time-shifted with respect to one another, namely in such a way that there is never a congruence of two spread intervals pertaining to different data streams. Therefore, in the present example, the spread intervals $[B_{1,m}]$, $[B_{2,m}]$, and $[B_{3,m}]$, all being of the length T, must never begin at the same instant. Rather, they must observe a minimum mutual time distance delta_T. (Delta$_{13}$ T is obviously shorter than the length T of a time slot.) According to the embodiment shown in FIG. 1, the time spacing delta_T is the same size for all (for example, delta_T=T/K; K=number of users). The second DSSS signal $\{B_{2,m}s[.]\}$ thus exhibits a shift of delta_T with respect to the first DSSS signal $\{B_{1,m}s[.]\}$. The third DSSS signal $\{B_{3,m}s[.]\}$ is delayed by delta_T with respect to the second one $\{B_{2,m}s[.]\}$ and by 2 delta_T with respect to the first $\{B_{1,m}s[.]\}$.

During transmission, the DSSS signals pertaining to different data streams $\{B_{1,m}s[.]\}$, $B_{2,m}s[.]\}$, $\{B_{3,m}s[.]\}$ are superimposed. A receiver interested in a specific one of the data streams thus must first filter this one out of the incoming signal. According to the invention, this is done with an approximated inverse filter. The desirable ideal inverse filter involves a filter inverse with respect to the spread sequence. This filter has the property of responding to the predetermined spread sequence as such with a pure Kronecker delta sequence δ[k]. This will be explained in greater detail below.

The receiver differs from a known DSSS receiver, therefore, by the use of an approximated inverse filter in place of a matched filter.

The matched filter, the coefficients v[k] of which would thus be given in accordance with $v[k]=s[-i]^*$, essentially determines a correlation function of the spread sequence. The latter has a maximum at a relative time shift by zero scanning values. Several secondary peaks are grouped around the maximum. For shifts larger than L scanning values, the correlation function disappears since the spread sequence itself has the finite length L.

The inverse filter has a quite different effect. Its response to the spread sequence as such produces a Kronecker delta sequence. Such a sequence, as is known, is distinguished in that it has only one scanning value different from zero.

Under practical conditions, a pure Kronecker delta sequence can be realized only in an approximation since otherwise the inverse filter would have to exhibit infinitely many filter coefficients $v[k]$.

For this reason, the pulse response of the filter is restricted to a length $-M_1 \leq k \leq L+M_2$. Outside of this window, the filter coefficients $v[k]$ are identical to zero. The filter coefficients $v[k]$ different from zero are selected according to this invention so that upon excitation of the filter by the spread sequence the resultant output signal will approach the Kronecker delta sequence as closely as possible.

As can be derived from the concurrent application by F. Neeser et al, cited above, three preferred embodiments exist for the approximation:

1. Truncating the ideal filter (truncation).
2. Least square approximation of the Kronecker delta sequence.
3. Maximum peak/off peak ratio.

Due to the fact that the coefficients $v[k]$ of the ideal inverse filter will disintegrate exponentially for large k in case of a suitably selected spread sequence, rather good results can be attained even with filters of a reasonable length. In accordance with a preferred embodiment, the coefficients $v[k]$ of the inverse filter obey the following relationship:

$$v[k] = \frac{1}{2\pi} \int_{-\pi}^{\pi} \frac{d\Omega}{\sum_{i=0}^{L-1} s[i]e^{j(i-k)\Omega}}, \quad k = -M_1 \ldots L + M_2.$$

$$v[k] = 0, \text{ for } k < -M_1 \text{ and } k > L + M_2.$$

For $-M_1 \leq k \leq L+M_2$, the filter coefficients correspond to the ideal case; outside of the mentioned range they are simply set at zero. The approximated inverse filter therefore corresponds to the truncated ideal inverse filter ($M_1$ and $M_2$ are predeterminable numbers, i.e. so-called design parameters).

A filter designed in this way has been known as such from the publication by Jürg Ruprecht, "Maximum-Likelihood Estimation of Multipath Channels", Diss. ETH No. 8789, Zuerich 1989, Hartung-Gorre publishers. It has also been demonstrated in the latter publication that the coefficients disintegrate exponentially for large k and consequently the truncation definitely yields good results.

In the least square approximation, the approximated inverse filter responds upon excitation by the predetermined spread sequence $s[.]$ as such with an output sequence approximating the Kronecker delta sequence along the lines of minimum square errors.

In the third approximation, the output sequence has, in the mentioned case, a maximum peak/off peak ratio. In other words, the largest secondary peak is made as small as possible as compared with the main peak. This involves an approximated realization of the infinitely large peak/off peak ratio of a Kronecker delta sequence.

An important property of the inverse filter furthermore resides in that the secondary peaks which can be quantitatively detected mathematically by means of the so-called peak/off peak ratio (POP ratio) can be kept very small with a suitable choice of the spread sequence as compared with the main pulse. It is therefore recommended to select from the spread sequences of a given length the one having the largest POP ratio.

By filtering, with an inverse filter, the incoming signal rather than the spread sequence as such then a signal is produced as a consequence which can be divided into periodically recurring time slots, each time slot containing the information via a symbol. The length of a time slot corresponds to the time shift of the various corresponding DSSS signals $\{B_{1,m}s[.]\}$, $\{B_{2,m}s[.]\}$, $\{B_{3,m}s[.]\}$ in the transmitters. In order to detect a specific data stream, it is thus merely necessary to evaluate the corresponding time slots.

Figure 2:
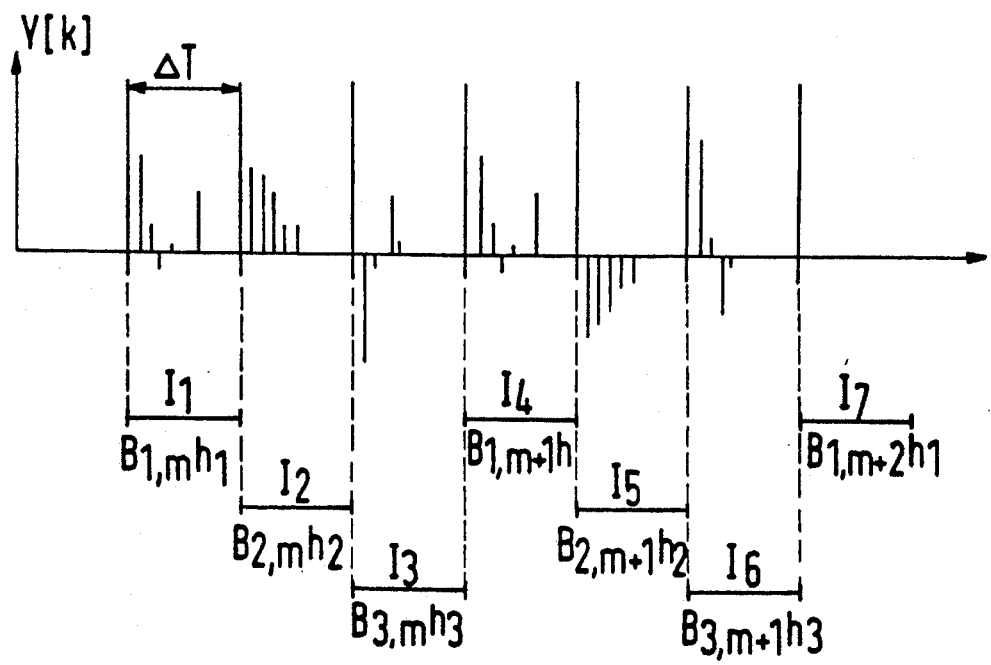
FIG. 2 is a schematic view of the incoming signal filtered by means of the inverse filter.

FIG. 2 shows by way of example a signal curve $Y[k]$ at the output of the inverse filter. The time slots are denoted by $I_1, \ldots, I_6$. They have a length delta_T in the present case (compare FIG. 1). The time slots spaced apart by one time interval T (symbol period) pertain in each case to the same data stream. In case of K (here K=3) different data streams, the respectively K-th (here third) time slots $I_1, I_4, \ldots$, respectively $I_2, I_5, \ldots$, respectively $I_3, I_6, \ldots$, contain the information of one and the same data stream.

Before describing the further processing of the signal from mutually corresponding time slots, remarks regarding the signal transmission will be set forth.

In a mobile radio system, for example, the various data streams stem from various participants. During transmission of the DSSS signals from the mobile stations to the base station, the signals are shaped in correspondence with the associated channel $h_k(t)$, $k=1 \ldots K$. Thus, normally, the various DSSS signals will be varied differently.

It has been explained above that the system response of the inverse filter to the spread sequence as such is essentially a Kronecker delta sequence. An undeformed DSSS signal produces a sequence of pulses at the aforementioned filter output. The pulses have a time spacing T (symbol period) and are weighted in correspondence with the respective symbol value of the data stream.

The shaping of the DSSS signal by the channel now has the consequence that there is produced, at the output of the inverse filter, in place of weighted pulses, the (equivalent, time-discrete) transmission function $h_k[.]$ of the channel $h_k(t)$, multiplied by a symbol value.

The output signal $Y[k]$ shown in FIG. 2 is therefore composed, in principle, of weighted channel transient responses. Thus, in time slot $I_1$, $Y[k]$ has essentially (i.e. apart from noise components) the curve $B_{1,m}h_1$, wherein $B_{1,m}$ means the symbol value and $h_1$ means the channel transient response of the channel between the first user and the receiver. In time slot $I_4$, likewise to be associated with the first data stream, the output signal corresponds analogously to the channel transient response multiplied by the subsequent symbol value of the data stream: $B_{1,m}h_1$. Analogous remarks apply for the remaining time slots $I_2, I_5, \ldots$, respectively $I_3, I_6, \ldots$ The example shown in FIG. 2 refers to the binary case $B_{k,m} = +/-1$. Since the polarity of the output signal $Y[k]$ is positive in time slots $I_1$ and $I_4$, the corresponding symbol values are: $B_{1,m} = +1$, $B_{1,m+1} = +1$. From analogous considerations, the following results: $B_{2,m} = +1$, $B_{2,m+1} = -1$, $B_{3,m} = -1$, $B_{3,m+1} = +1$.

Thus, for detecting the data, the receiver extracts all time slots that belong together (i.e., for the k-th data stream in each case the k-th time slots of a frame made up of K time slots), filters this extracted signal with a channel-adapted matched filter (the transient response of which, as is known, is $h^*[-.]$), extracts the real portion of the resultant signal, and performs a threshold value detection. In this way, the symbols are estimated in accordance with the ML principle (ML=maximum likelihood).

The details regarding the ML detector can be seen from the application by the inventors F. Neeser et al., already mentioned above. In particular, that application also describes a method for estimating the coefficients of the channel-adapted matched filter $h^*[-.]$ which can also be utilized in the present invention.

According to an advantageous embodiment, the time shift delta_T of the spread sequence intervals pertaining to different data streams is larger than the duration of the transient response of a channel utilized for transmitting the corresponding DSSS signal. Thereby it is possible to clearly separate the individual users from one another, because the signal components pertaining to differing data streams will nowise be superimposed in the incoming signal. Besides, it is possible thereby, in accordance with an advantageous embodiment, to estimate the channel transient response for each transmission channel by means of the detector.

In order to be able to transmit as many data streams as possible simultaneously, i.e. to be able to realize a transmission system having a maximally large capacity, it is necessary to keep the time shift of the DSSS signals as small as possible.

However, the time shift should not drop below a predetermined minimum value; otherwise, the incoming signal can no longer be demultiplexed. This lower limit corresponds preferably to the longest occurring channel transient response plus a chip period and is essentially the same for all DSSS signals.

It is simplest if the time shift delta_T is fixed once and for all (for example during the implementation of the system). However, there is definitely also the possibility to adapt this shift to the concrete circumstances of the transmission channels.

The advantage of the invention resides in that no exact synchronization is needed. Within a limited scope, it is thus definitely feasible to further develop the multiple access method of this invention along the lines of an Aloha or Slotted Aloha method ("random access").

A preferred alternative resides in providing, during implementation, a separate synchronizing channel besides the joint data channel. Via this synchronizing channel, synchronizing signals are transmitted (for example through the base station) to the participants of the transmission system for maintaining the minimum chronological spacings. Such auxiliary channels are also utilized, for example, in TDMA systems.

A degree of freedom, not discussed thus far but definitely of possible importance for the quality of the transmission system, is the concrete choice of the spread sequence. According to an advantageous embodiment of the invention, the spread sequence s[.] is fixed so that the process gain G, defined by the inverse of the energy of the associated inverse filter:

$$G = \frac{1}{\sum_{i=-\infty}^{+\infty} v_i^2}$$

is at a maximum with respect to as many as possible, especially all, spread sequences of the same length.

In case of small sequence lengths L, it is possible to examine all possible pulse combinations of a specific length systematically for process gain and then to select the optimal spread sequence. In case of large lengths (e.g. L=100), this is not as yet possible thus far, for reasons of the required extremely long calculating time inasmuch as rapid systematic search algorithms are missing. Under practical conditions, a remedy is found by choosing a limited group of sequences having tendentially good properties and performing the optimization only within this group. In such a case, only a relative optimization is involved.

Figure 3A:
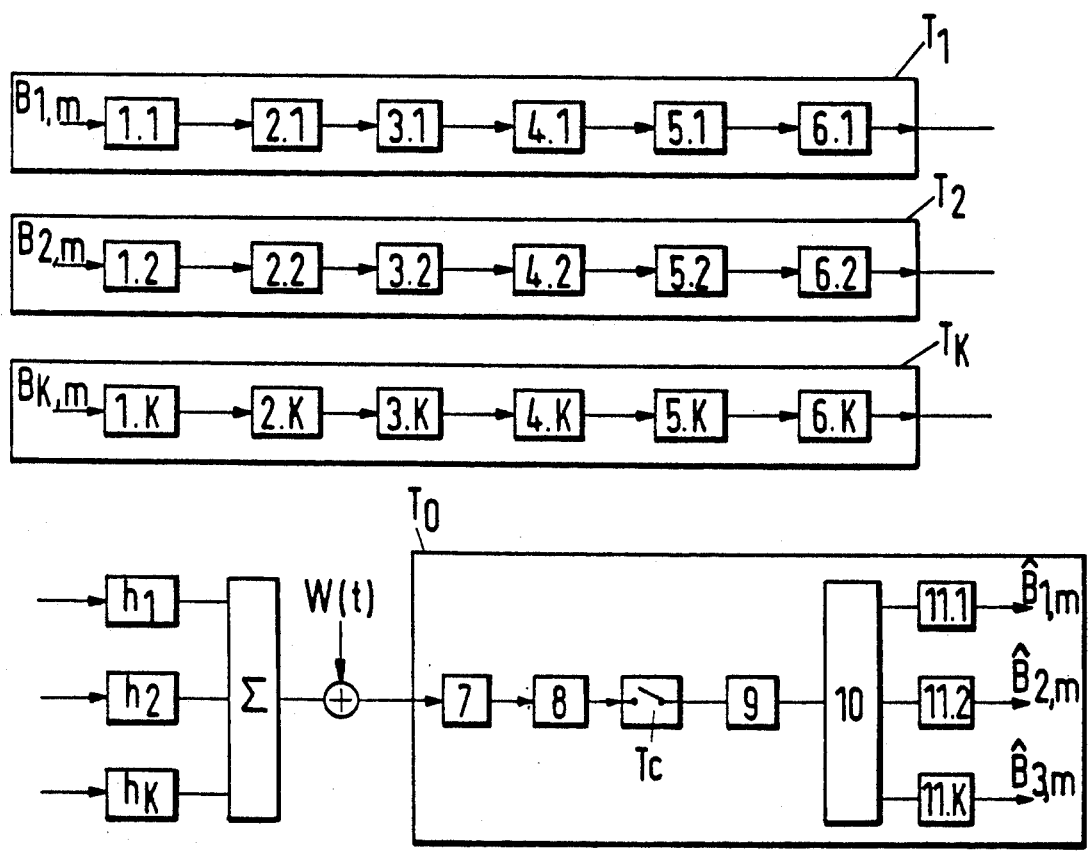
FIGS. 3a, b are block circuit diagrams of a mobile radio system in accordance with the invention.
Figure 3B:
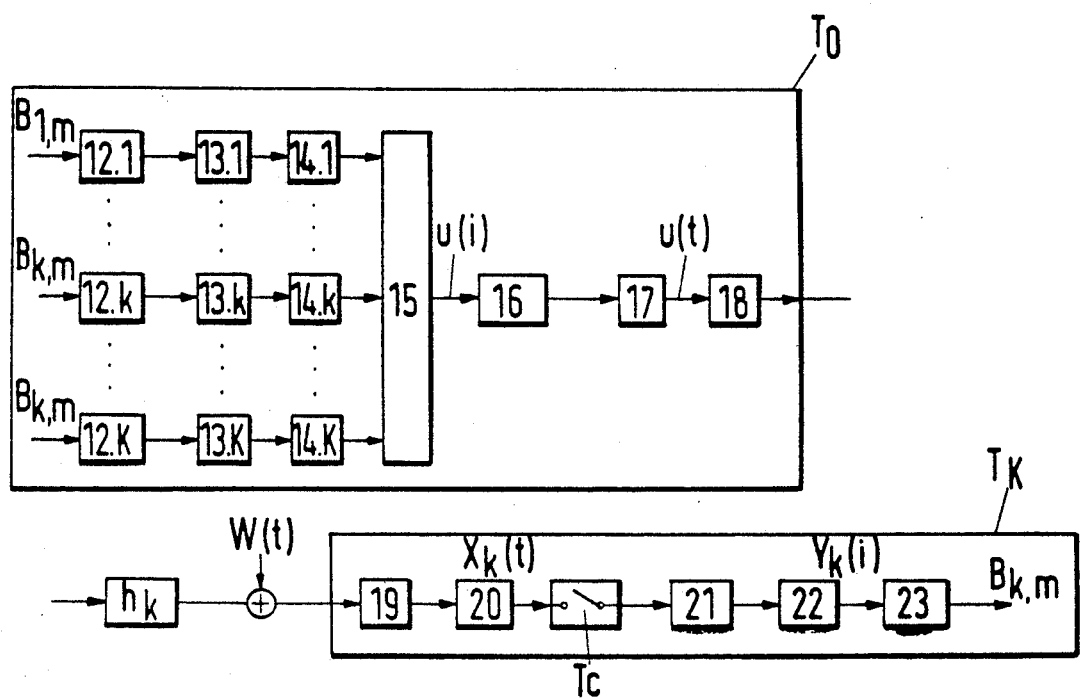

FIGS. 3a, b show a block circuit diagram of a mobile wireless transmission system according to this invention. It comprises a base station $T_0$ and K mobile subscriber stations $T_1, \ldots, T_K$. All of the stations are equipped with a transmitter circuit as well as with a receiver circuit in order to permit two-way communication. In FIG. 3a, the transmitters of the subscriber stations $T_1, \ldots, T_K$ and the receiver of the base station $T_0$ are illustrated, and FIG. 3b shows the receivers of the subscriber stations $T_1, \ldots, T_K$ and the transmitter of the base station $T_0$.

The transmitter of the K-th subscriber station $T_K$, for example, comprises an expander 1.K which chronologically expands the data stream $\{B_{K,m}\}$ by changing over from the symbol interval T to the chip interval $T_C=T/L$ (L=number of chips in the spread sequence). A delay member 2.K introduces the required time shift $(K-1)T_C$ with respect to the other participants into the data stream. In the spread sequence generator 3.K, the predetermined joint spread sequence s[.] is multiplied with the respectively applied symbol value. In this way, the digital DSSS signal is produced. A time-continuous DSSS signal is generated by means of a pulse modulator 4.K and a low-pass filter 5.K; this signal is then modulated onto a carrier oscillation in a manner known per se in a conventional modulator 6.K.

The individual subscriber stations $T_1, \ldots, T_K$ are all identical, in principle. They differ in their operation only by the delay applied to their data stream.

During transmission, the signals are shaped and burdened by noise through the respective channel $h_1, h_2, \ldots, h_K$ [additive white Gaussian noise W(t)]. The signals of the various subscriber stations are heterodyned in the receiver ($\Sigma$).

The receiver of the base station $T_0$ demodulates the carrier oscillation (demodulator 7), filters out the relevant frequency range (filter 8), and scans the filtered signal with the chip rate $1/T_C$.

According to an essential feature of the invention, the incoming signal X[i] is filtered with an inverse filter 9. Thereby an output signal Y[k] is obtained having the properties explained in connection with FIG. 2.

A selection circuit 10 extracts the time slots pertaining to the same data stream. For each data stream, an ML detector 11.1, ... 1 11.K is then connected.

FIG. 3b illustrates the reverse direction of data transmission. The base station $T_0$ processes in parallel K data streams $\{B_{k,m}\}$, $K-1 \ldots K$. Each one is spread (expander 12.1 ... 12.K) and provided, in a delay member 13.k, k=1 ... K, in a suitable way with a time shift $(k-1)$delta_T, k=1 ... K. The delayed signals are processed into DSSS signals in spread sequence generators 14.1 ... 14.K. A summing circuit 15 heterodynes the K DSSS signals into a digital transmission signal U(i). The latter is processed conventionally with a pulse modulator 16 and a low-pass filter 17 to a time-continuous signal U(t). A modulator 18 modulates a predetermined carrier oscillation in correspondence with the time-continuous signal U(t).

During transmission to the k-th subscriber station $T_k$, the modulated carrier oscillation experiences deformation in the channel $h_k$ and impairment by an additive white Gaussian noise W(t).

The subscriber station $T_k$ demodulates the carrier oscillation and filters out the desired frequency range (demodulator 19, filter 20). The resultant incoming signal $X_k(t)$ is scanned with an integral multiple of the chip rate $1/T_C$ and then filtered with the inverse filter 21. The scanned incoming signal is thereby relieved of its spread. A selection circuit 22 extracts, in accordance with the method of this invention, the time slots allotted to the subscriber station $T_k$ (for example always the k-th from a framework of K time slots). In this way, a signal $Y_k$ is obtained from which the data stream ($B_{k,m}$, characterized with a circumflex) can be estimated by means of an ML detector 23.

The details regarding the ML detector 23 can be derived from the concurrent application (F. Neeser et al.) mentioned repeatedly hereinabove.

While the heterodyning during transmission in the direction of the base station takes place "automatically" (the signals transmitted by the various participants are physically superimposed), this occurs, in the reverse direction, in an "active" fashion, i.e. on an electronic or, respectively, circuit-technology level (summing circuit 15).

The various embodiments described in conjunction with the method of this invention can be readily implemented from the viewpoint of circuitry in light of the specification.

Finally, it can be noted that the invention provides a multiple access method combining therein the advantages of TDMA and CDMA. In particular, a practically total separation of the users is made possible without requiring the precision of synchronization customary in case of TDMA.

| List of Symbols | |
|---|---|
| 1.1, . . . , 1.K, 12.1, . . . , 12.K | expander |
| 2.1, . . . , 2.K, 13.1, . . . , 13.K | delay member |
| 3.1, . . . , 3.K, 14.1, . . . , 14.K | spread sequence generator |
| 4.1, . . . , 4.K, 16 | pulse modulator |
| 5.1, . . . , 5.K, 17 | low-pass filter |
| 6.1, . . . , 6.K, 18 | modulator |
| 7, 19 | demodulator |
| 8, 20 | filter |
| 9, 21 | inverse filter |
| 10, 22 | selection circuit |
| 11.1, . . . , 11.K, 23 | ML detector |
| 15 | summing circuit |
| $\{B_{1,m}\}, \{B_{2,m}\}, \{B_{3,m}\}$ | data streams |
| $B_{1,m}, B_{2,m}, B_{3,m}$ | symbols |
| s[.] | spread sequence |
| $\{B_{1,m}s[.]\}, \{B_{2,m}s[.]\}, \{B_{3,m}s[.]\}$ | DSSS signal |
| delta__T | shift |
| $h_k(t)$ | channel |
| $I_1, \ldots, I_6$ | time slots |
| $T_C$ | chip period |
| $1/T_C$ | chip rate |
| T | symbol period |
| $T_0$ | base station |
| $T_1, \ldots, T_K$ | subscriber stations |
| U(i) | transmission signal |
| W(t) | white Gaussian noise |
| $X_k(t)$ | incoming signal |
| Y[k] | output signal |

I claim:

1. Multiple access method for the simultaneous exchange of several data streams among several participants of a transmission system, wherein various data streams with the same spread sequence are expanded to a corresponding DSSS signal, and the various DSSS signals are superimposed during transmission to a single incoming signal, characterized in that, for detecting the different data streams in a receiver, the incoming signal is filtered in a filter that is inverse with respect to the joint spread sequence, and that the superposition takes place in such a way that the spread sequence intervals pertaining to different data streams are time-shifted with respect to one another by a predetermined minimum value.

2. Multiple access method according to claim 1, characterized in that the time shift of the spread sequence intervals pertaining to different data streams is larger than a chip period plus the duration of the transient response of a channel utilized for the transmission of the corresponding DSSS signal.

3. Multiple access method according to claim 2, characterized in that the time shift with respect to adjacent spread sequence intervals is substantially of equal size for all spread sequence intervals pertaining to different data streams.

4. Multiple access method according to claim 1, characterized in that the inverse filter is selected so that it responds, upon excitation by the predetermined pulse sequence (s[.]) as such, approximately with a Kronecker delta sequence ($\delta[k]$) as the output sequence.

5. Multiple access method according to claim 1, including selecting the coefficients v[k] of the inverse filter pertaining to the spread sequence s[.] from the following approximated truncated inverse filter formula:

$$v[k] = \frac{1}{2\pi} \int_{-\pi}^{\pi} \frac{d\Omega}{\sum_{i=0}^{L-1} s[i]e^{j(i-k)\Omega}}, k = -M_1 \ldots L + M_2,$$

$$v[k] = 0, \text{ for } k < -M_1 \text{ and } k > L + M_2.$$

wherein $M_1$ and $M_2$ are predetermined filter pulse response length design parameters, and L corresponds to the length of the spread spectrum sequence.

6. Multiple access method according to claim 1, including, fixing the spread sequence s[.] so that the process gain G, defined by the inverse of the energy of the associated inverse filter:

$$G = \frac{1}{\sum_{i=-\infty}^{\infty} v_i^2}$$

is at a maximum with respect to as many as possible, and preferably all, spread sequences having a given length L, wherein $v_i$ designates the coefficients of the inverse filter.

7. Multiple access method according to claim 1, characterized in that, for maintaining the minimum chronological spacings, synchronization signals are transmitted via a separate channel to the participants of the transmission system.

8. A mobile radio system having at least one base station and several subscriber stations for the simultaneous exchange of several data streams among the several subscriber stations of the mobile radio system, wherein various data streams with the same spread sequence intervals are expanded to a corresponding DSSS signal, and the various DSSS signals are superimposed during transmission to an single incoming signal, comprising

- a receiver in said base station and in each of said several subscriber stations for detecting the different data streams in the single incoming signal;
- an inverse filter in each said receiver, inverse with respect to the joint spread sequence, connected for filtering the incoming signal, a transmitter in said base station and in each of said several subscriber stations, and
- means connected in each said transmitter for time-shifting the spread sequence intervals pertaining to the several different data streams with respect to one another by a predetermined minimum value.

9. A mobile radio system according to claim 8, in which the subscriber stations and the base station include means for modulating a carrier oscillation according to a given DSSS signal wherein the carrier oscillation is the same for all subscriber stations and the base station.

10. Multiple access method according to claim 1, including selecting the coefficients $v[k]$ of the inverse filter pertaining to the spread sequence $s[.]$ from the minimum square errors approximation, the coefficients $v[k]$, $k = -M_1 \ldots L+M_2$, wherein $M_1$ and $M_2$ are predetermined filter pulse response length design parameters, and L corresponds to the length of the spread spectrum sequence, being determined so that upon excitation by the predetermined pulse sequence $s[.]$ as such, the approximated inverse filter response with an output sequence approximating the Kronecker delta sequence along the lines of the smallest square errors.

11. Multiple access method according to claim 1, including selecting the coefficients $v[k]$ of the inverse filter pertaining to the spread sequence $s[.]$ by the maximum peak/off peak ratio approximation, said approximated inverse filter with a predetermined number of coefficients $v[k]$, $= -M_1 \ldots L+M_2$, wherein $M_1$ and $M_2$ are predetermined filter pulse response length design parameters, and L corresponds to the length of the spread spectrum sequence, responding upon excitation by the given pulse sequence $s[.]$ as such with an output sequence approximating the Kronecker delta sequence along the lines of a maximum peak/off peak ratio.

* * * * *